Oct. 5, 1954   W. C. SEYTER ET AL   2,690,948
BALANCE CASE
Filed March 28, 1951   5 Sheets-Sheet 1
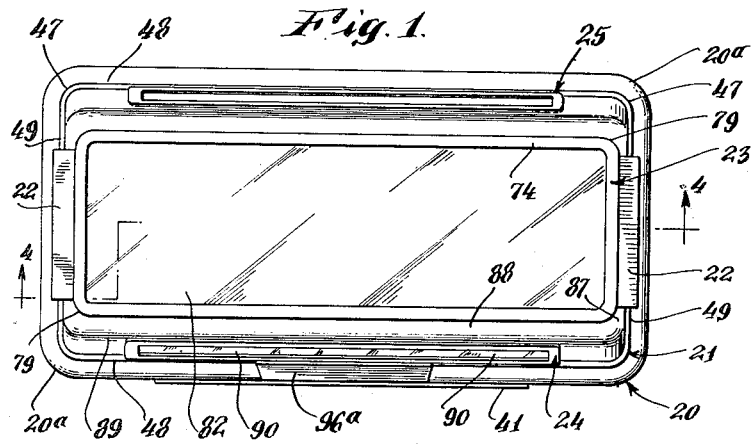
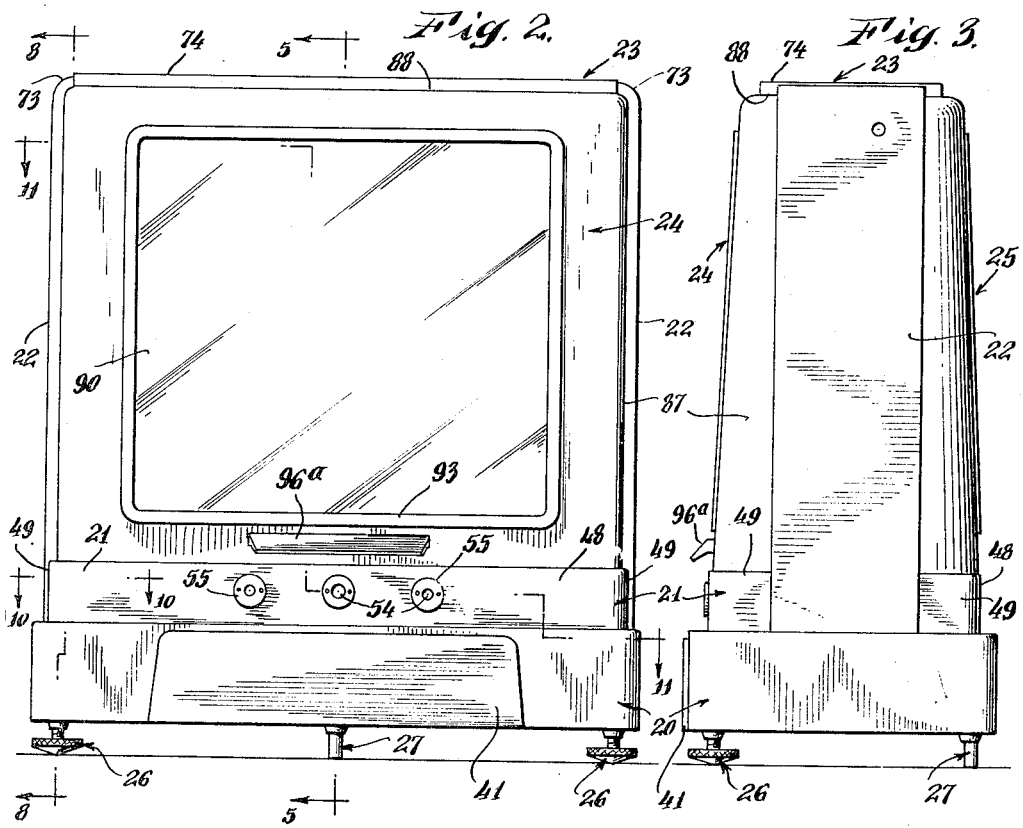
INVENTORS.
William C. Seyter
William Mender
BY Thomas Windisch
ATTORNEYS.

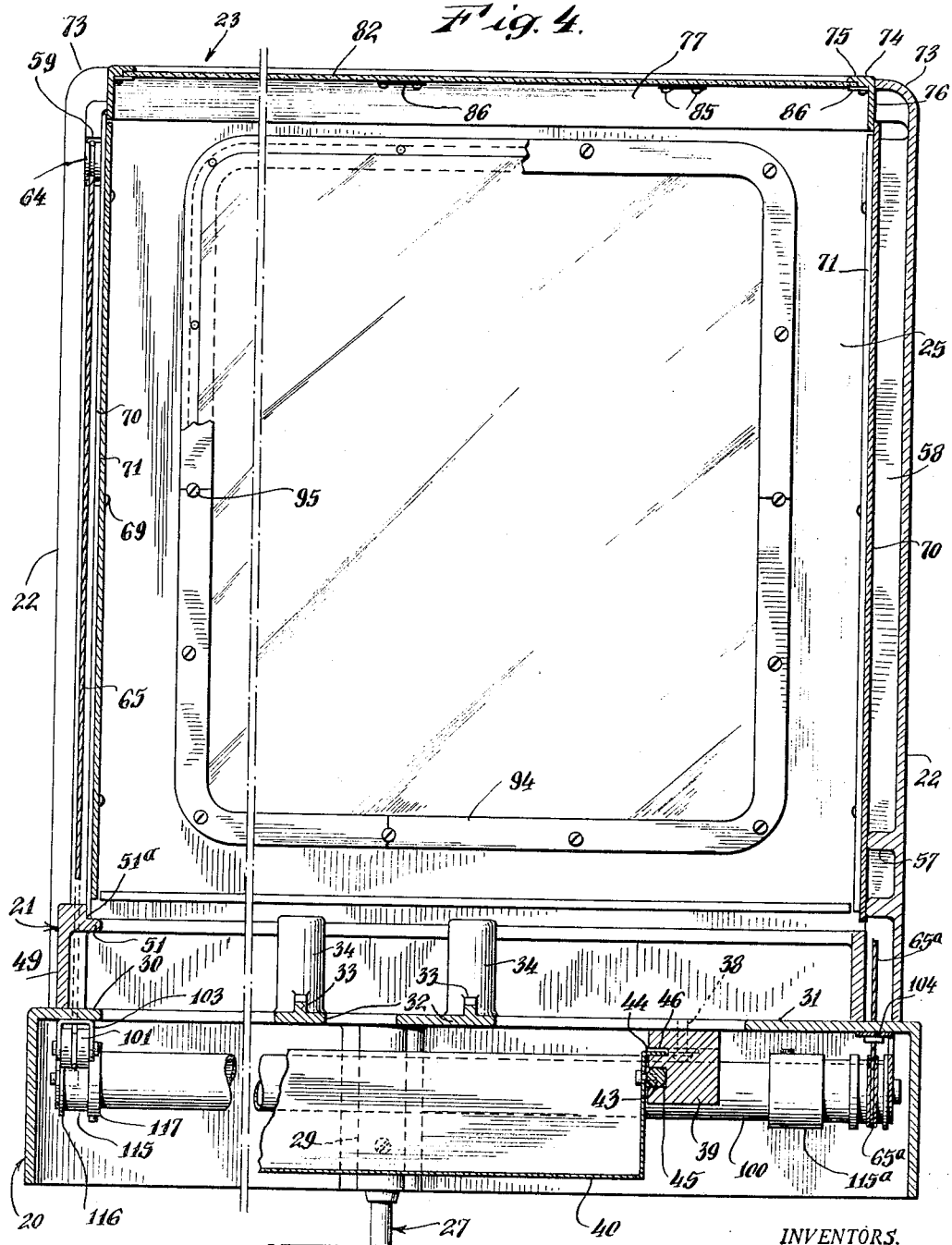

Oct. 5, 1954 W. C. SEYTER ET AL 2,690,948
BALANCE CASE
Filed March 28, 1951 5 Sheets-Sheet 3
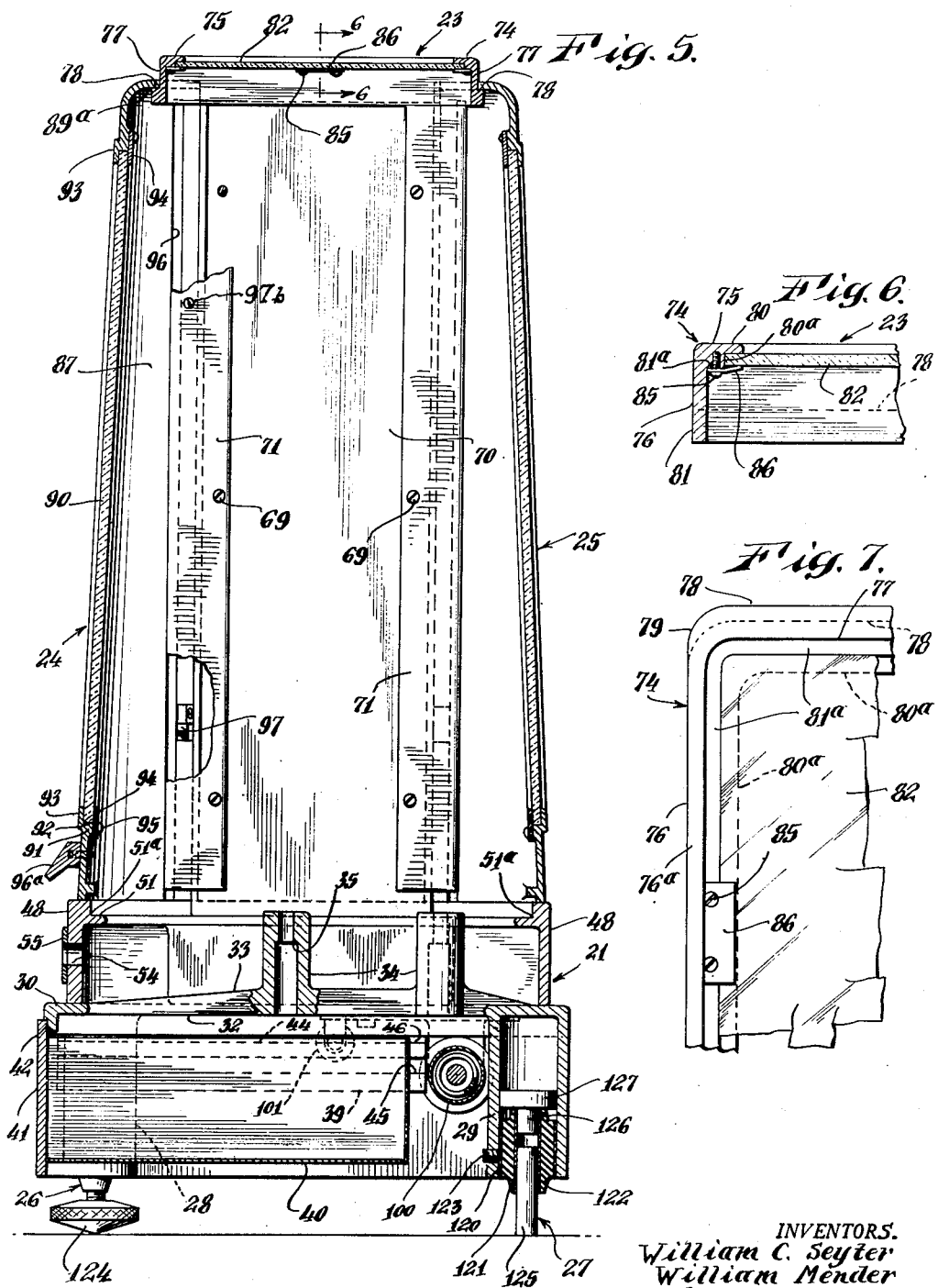
INVENTORS.
William C. Seyter
William Mender
Thomas Windisch
BY
Fraser, Myers & Manley
ATTORNEYS

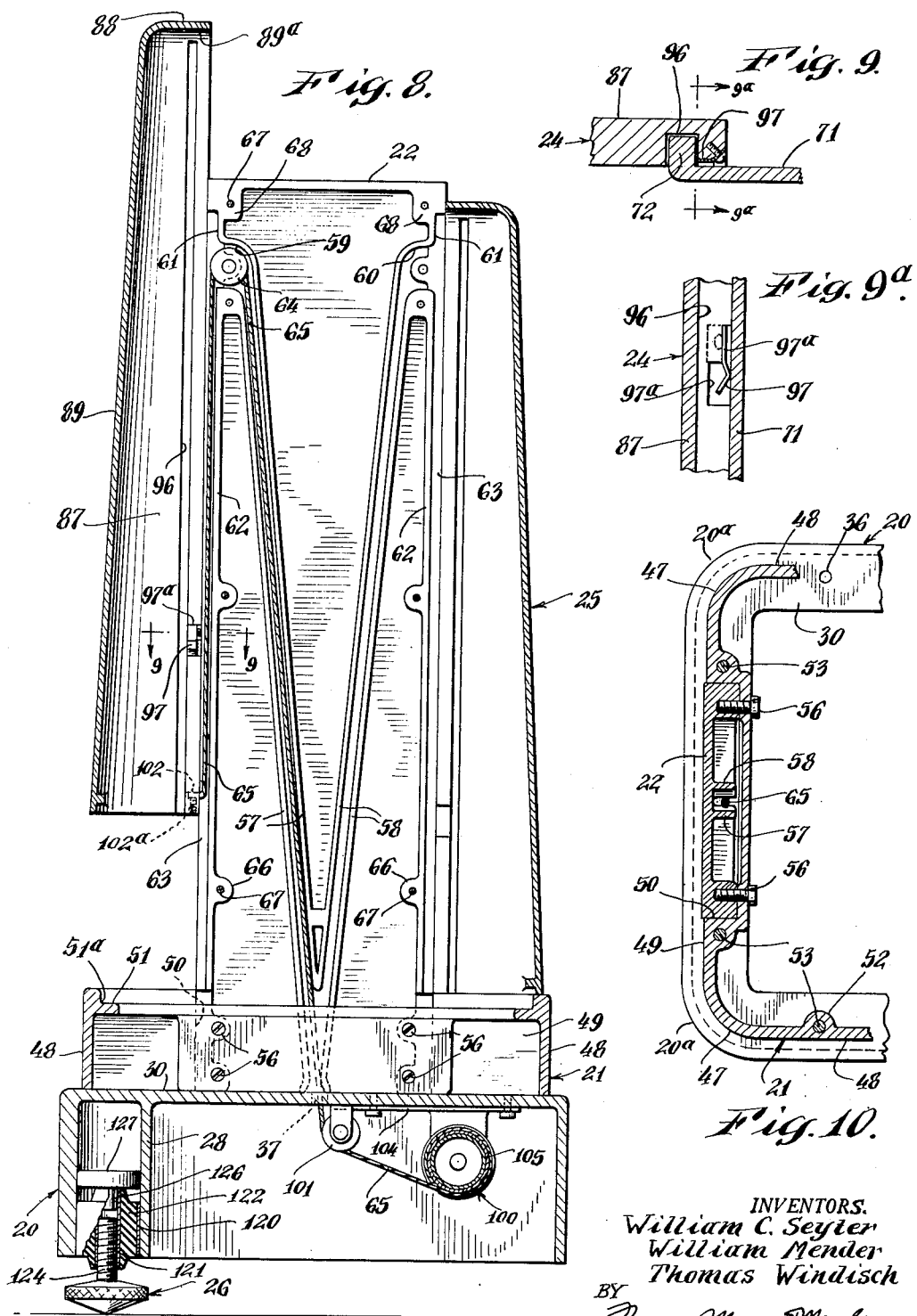

Oct. 5, 1954     W. C. SEYTER ET AL     2,690,948
BALANCE CASE
Filed March 28, 1951     5 Sheets-Sheet 5
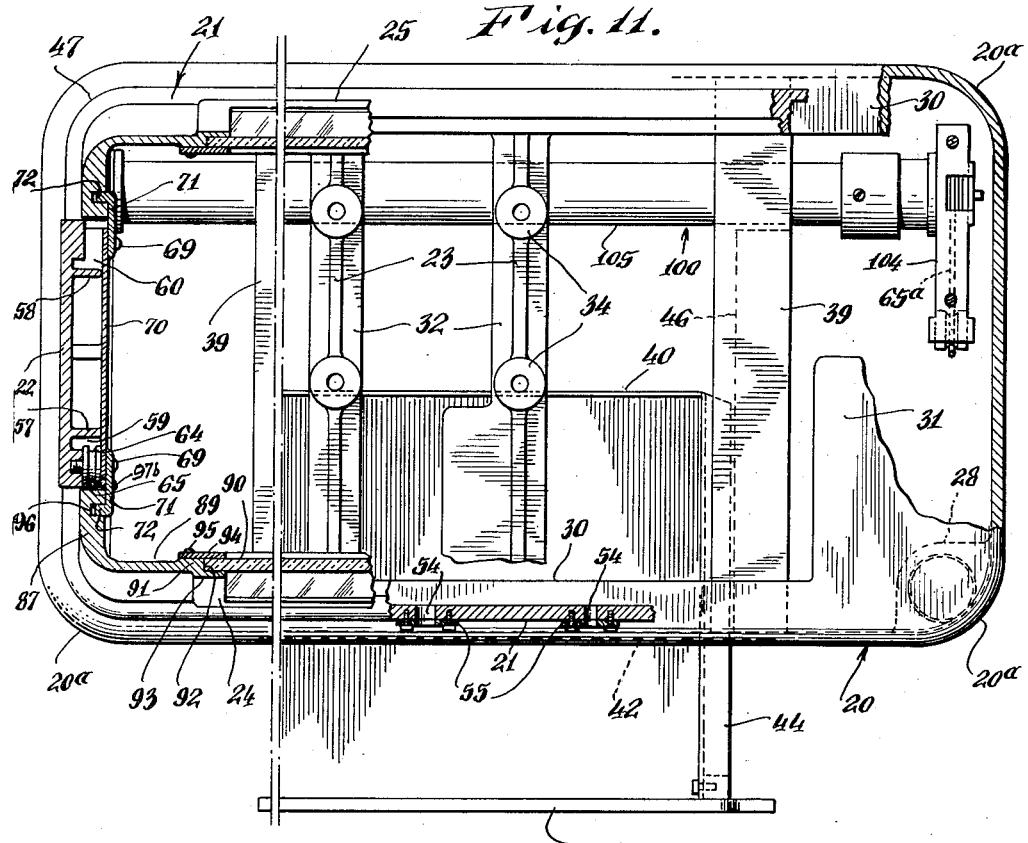
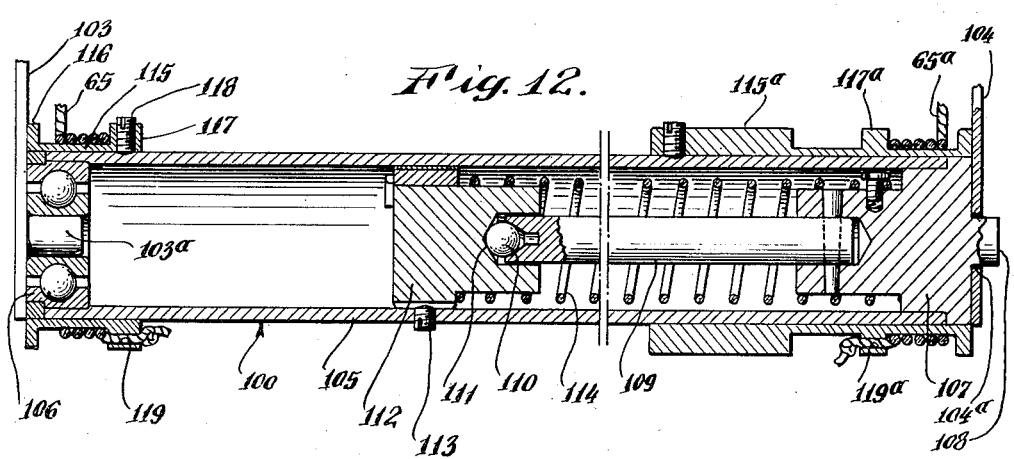
INVENTORS.
William C. Seyter
William Mender
Thomas Windisch
BY
Fraser, Myers & Manley
ATTORNEYS.

Patented Oct. 5, 1954

2,690,948

UNITED STATES PATENT OFFICE 2,690,948

BALANCE CASE

William C. Seyter, Union City, William Mender, Midland Park, and Thomas Windisch, Montclair, N. J., assignors to The Torsion Balance Company, Clifton, N. J., a corporation of New York Application March 28, 1951, Serial No. 217,962

4 Claims. (Cl. 312—138)

1

The present invention relates to a weighing scale or balance case and aims to provide certain improvements therein.

Among the objects of the invention are: (1) to provide a balance case wherein the doors are so disposed to afford greater and facile access to the interior of the case; (2) wherein the use of sash weights for the doors is eliminated; (3) wherein an adjustable even tension is obtained throughout the entire travel of the front door, which may be opened as wide as desired; (4) wherein vibrations which affect the weighing operation are effectively eliminated; and (5) to generally improve the construction of such balance case.

The invention comprises the advantages, combinations and arrangements of parts set forth in the following detailed description and illustrated in the accompanying drawings, from which the several features of the invention, together with the advantages obtainable thereby will be readily understood by persons skilled in the art.

In the drawings, where like reference characters are used to denote corresponding parts throughout the several figures:

Figure 1 is a top plan view of a balance case embodying our invention.

Fig. 2 is a front elevational view of the balance case.

Fig. 3 is a side elevational view of the balance case.

Fig. 4 is a vertical sectional view longitudinally of the case, taken along the plane of the line 4—4 of Fig. 1.

Fig. 5 is a vertical sectional view transversely of the case, taken along the plane of the line 5—5 of Fig. 2.

Fig. 6 is a sectional view, on an enlarged scale, of the top of the case, said sections being taken along the plane of the line 6—6 of Fig. 5.

Fig. 7 is a fractional bottom plan view of the top of the case.

Fig. 8 is a vertical sectional view transversely of the case, taken along the plane of the line 8—8 of Fig. 2.

Fig. 9 is a sectional view on an enlarged scale taken along the plane of the line 9—9 of Fig. 8.

Fig. 9a is a sectional view taken along the plane of the line 9a—9a of Fig. 9.

Fig. 10 is a sectional view taken along the plane of the line 10—10 of Fig. 2.

Fig. 11 is a sectional view taken along the planes of the broken line 11—11 of Fig. 2.

Fig. 12 is a diametral sectional view of the sash roller assembly which constitutes a feature of our invention.

Referring first to Figs. 1 to 3 of the drawings, the balance case comprises a lower base section 20, an upper base section 21, side walls 22, 22, a top wall 23, a front door 24, a rear door 25 and shock mounts 26 and 27.

Lower base section

Referring now more particularly to Figs. 1 to 4, 5, 8, 10 and 11 of the drawings, the lower base section consists of a substantially rectangular frame having rounded corners 20a which frame is preferably formed of an aluminum alloy or the like by the die-casting or an analogous process. The two front corners of the frame are formed with hollow bosses 28 for accommodating the shock mounts 26, and midway of the rear wall, the frame is formed with a boss 29 for accommodating the shock mount 27. At its top the frame is formed with a top, inwardly directed perimetral flange 30 which, at the front right corner, has a right angular extension 31. Connecting the front and rear portions of the flange 30 in adjacent spaced relation to the transverse central line of the frame are a pair of parallel cross-arms 32 which are formed with longitudinal reinforcing ribs 33, and extending upwardly from each of the cross-arms 32 are a pair of hollow posts 34 each having an internal shoulder 35 (Figs. 4, 5 and 11) to provide an abutment for the head of an attaching screw for holding a metal plate which supports bearings for the shafts for operating the pan arrests, the lift rod for the beam arrests and the zero adjusting index of the balance (not shown) but which are disclosed and described in our copending application Serial No. 217,961, filed March 28, 1951. The perimetral flange 30 is formed with spaced openings 36 (Fig. 10) through which extend screws for securing the upper base section 21, presently to be described in detail, to the lower base section. The side portions of the perimetral flange 30 are also formed with through openings 37 (Fig. 8) for the passage therethrough of sash roller cords, for a purpose presently to be described. The front and rear portions of the flanges 30 are also formed with threaded openings 38 (Fig. 4) for accommodating the screws that support guide blocks 39, within which are slidable a drawer 40. The drawer 40 has a somewhat enlarged front wall 41 adapted to seat within a depression 42 formed within the front wall of the lower base (Fig. 5). The drawer 40 carries on its opposite sides cylindrical rails 43 and is formed with angularly extending flanges 44 which slide respectively in grooves 45 and 46 formed in the guide blocks 39.

Upper base section

The upper base section 21 consists of a substantially rectangular frame of die-cast aluminum or analogous metal of slightly smaller dimensions than the lower base section and with rounded corners 47, front and rear walls 48, 48 having substantially flat outer surfaces and end walls 49, 49 each formed with a substantially rectangular, outwardly directed channel groove 50 extending the full height thereof. The upper base section adjacent its top is formed with a perimetral, inwardly directed flange 51, and extending inwardly from its walls at spaced distances apart, below said flange, are bosses 52 which have tapped openings therein for receiving screws 53 which extend upwardly through the openings 36 and 37 in the lower base section to hold said sections in assembled relation. The perimetral flange 51 provides with the sides of the section a rabbet groove 51a adapted to accommodate the base plate (not shown) of the balance. The front wall 48 has three spaced holes 54 extending therethrough which provide bearings for the operating shafts for the pan arrests, the beam arrest lifter rod and the zero adjusting index plate of the balance structure. Escutcheon discs 55 may be mounted on the front panel to surround the holes 54.

Side walls

The side wall members 22 are identical in form and interchangeable, hence only one of said members will be described. The side wall members, like the base members, are preferably formed of die-cast aluminum or analogous metal and are of generally rectangular form having a width to closely fit within the channels 50 in the upper base member 21 to which they are secured by screws 56. The bottom of each side member seats on the flange 30 of the lower base member. The outer face of each side member is generally flat, while the inner face is recessed and formed with two divergent pairs of ribs 57, 57 and 58, 58, each pair of ribs forming a channel and said channels merging at the bottom of the side member in a channel in alignment with the opening 37 in the flange 30 of the lower base member. The pairs of ribs 57 and 58 flare outwardly at their top to provide recesses 59 and 60 and then continue parallel to the longitudinal edges of the side walls as ribs 61 and 62 which are spaced inwardly from said side edges and provide therewith rabbeted grooves 63 extending parallel to said side edges of the side walls of the member. Rotatably mounted in at least one of the recesses 59 and 60 is a pulley 64 over which is trained a cord 65 or 65a which is guided in the channels formed by the pairs of ribs 57 and 58 and in the rabbet grooves 63, the function for which cords will be presently explained. The inner face of the side member at spaced points along its ribs 62 is formed with bosses 66 having tapped holes 67 therein and with analogous bosses 68 near the top of the member for accommodating screws 69 for holding a cover plate 70 over the inner face of the side member. Preferably the screws 69 also hold in position an angle plate 71 which serves the dual function of (1) converting the rabbet groove 63 into a channel for the cords 65 or 65a; and (2) for providing rails 72 for guiding the doors 24 and 25 in opening and closing the same.

Top wall

Referring now to Figs. 1 and 4 to 7 of the drawings, the top wall of the casing comprises a substantially rectangular frame 74 of generally right angular form in transverse section and preferably formed of die-cast zinc or the like. The outer top surface 75 of the frame is flat and the end members of the frame have flat outer faces 76. The front and rear members of the frame have rabbeted outer surfaces 77 providing shoulders 78. The outer corners of the frame are suitably rounded, as shown at 79. The generally right angular cross-sectional form of the top wall provides a top perimetral flange 80 and a depending perimetral flange 81, each of which is rabbeted, as shown at 80a and 81a, respectively (Fig. 6), the rabbet 80a providing a perimetrol seat for a glass panel 82 which is held in place by spring clips 86 which are angularly bent to bear against the inner face of the glass panel 82, said clips being secured by screws 85. The end flanges of the top wall are secured to the upper end portion of the side members 22 by screws (not shown) which extend through holes in said flanges and engage within the tapped holes in the bosses 68 (Fig. 8).

Front door

By referring to Figs. 1, 2, 3, 5, 8, 9 and 11 of the drawings it will be seen that the width of the side wall members 22 is only about one-half the corresponding dimension of the upper base section 21 upon which it is centrally mounted, thus leaving about one-fourth of the base panel (not shown) of the balance at the front of the case uncovered when the door is raised. By virtue of this increased space at the front and sides of the case, access to the weighing pans and the performing of the weighing operation are facilitated.

To fully enclose the base panel forwardly of the walls, the front door 24 is formed with side walls 87 having a width at the base thereof such as to extend from the side wall of the balance case to the front of the upper base section, said side walls of the front door having vertical rear edges complemental to but out of contact with the front edges of the side walls of the case, a narrow top wall 88 and an inclined front wall 89. To eliminate sharp corners on the front door, the side walls join the front wall and the top wall by curved portions, and the front wall merges with the top wall by a curved portion. The top wall is recessed inwardly from its rear edge to leave a narrow ledge 89a adapted to overlie the shoulder 78 on the front wall 77 of the top member 23. The front door frame is preferably formed as a die-casting of aluminum or like metal and has a substantially rectangular sight opening which is fitted with a glass panel 90. The door frame is formed with an internal perimetral rib 91 in spaced relation to the sight opening and said rib provides a perimetral rabbet groove 92 for the edge portions of the glass panel. The door frame on its outer surface around the sight opening is slightly raised above the remaining surface of the frame, as shown at 93 and has a satin finished surface. To hold the glass panel within the rabbet groove 92, four angular, flat metal strips 94 are secured to the rib 91 by screws 95. For guiding the door in its vertical movements the side walls 87 of the door on their inner faces are formed with vertical grooves 96 within which engage the guide rails 72 of the angular plates 71. For operating the door, it is provided with a finger-engaging strip 96a extending across the central lower portion of the door frame. The door can be positioned and held anywhere along its travel by a tensioned sash roller, which will be presently described. To provide a stop to limit the height to which the front door is to be opened in the normal use of the balance, the door is equipped with bowed springs 97 which are mounted in recessed portions 97a in the lateral side edges of the door to extend inwardly from said side edges and engage against a stop screw 97b extending through the angle guide rail plate 71 (Figs. 8 and 11).

The rear door 25 is substantially identical with the front door and merely differs therefrom in that the finger-engaging strip 96a, the spring clips 97 and the sash roller counterbalance means are not applied thereto.

Sash roller

In prior balance case constructions sash weights have been used to hold the doors in any position to which they had been moved. Sash weights must be attached to sash cords and, with prior balance cases the sash weights usually hit the glass base plate of the balance when the door was about half way opened, and where it was desired to obtain more access to the case the door had to be completely removed from the case. Moreover, the replacement of broken sash cords was complicated and no adjustment of the "tension" or door movement was possible.

According to the present invention, and particularly to the construction and arrangement of the sash roller, it is now possible to open the door as high as desired as a spring counterbalance is used. Moreover, the sash roller is so constructed that its spring tension may be readily adjusted, and once the correct tension has been obtained, it will so remain.

Referring now to Figs. 4, 5, 8, 11 and 12 of the drawings, it will be seen that the front door 24 is cooperatively connected with a sash roller 100 through the pair of cords 65 and 65a, one end of each cord being connected to the roller and the other end to the front door. The cords extend from the roller 100 over a guide pulley 101, then through the channel provided by the ribs 57 or 58, and over the pulley 64 down through the channel provided by the rabbet groove 63 and angle plate 71, and into a hole 102 drilled in the rear edge of the door where it is clamped in place by a set-screw 102a. Sash roller 100 and the pulleys 101 are mounted in brackets 103 and 104 which are secured by screws to the underside of the side portions of the perimetral flange 30 at the top of the lower base section. The brackets 103 and 104 are related to one another as are an object and its mirror image, and further differ from one another in that the bracket 103 has a round stud 103a for engaging in one end of the sash roller and the bracket 104 has a polygonal opening 104a for receiving a correspondingly shaped stud on the sash roller.

The sash roller 100 is of novel construction and consists of a tube 105 in one end of which is fixed an anti-friction bearing 106 and in the other end of which is rotatably mounted a plug 107 having a protruding polygonal stud 108 at its outer end. At its inner end the plug has fixedly mounted an axially extending rod 109 which, at its free end, carries a ball 110 which seats within a bearing 111 formed in a spring anchoring plug 112 adapted to be adjustably held within the tube 105 by a set-screw 113. A helical tension spring 114 is anchored at its opposite end by any preferred means to the plugs 107 and 112 so that the tension of the spring 114 may be adjusted by rotating the roller 100 relatively to the fixed plug 112 and inserting the stud 108 in the opening 104a. A left tube sleeve 115 formed with spaced annular flanges 116 and 117 is anchored to the tube 105 by a set-screw 118, and the flange 117 has a hole 119 therein extending parallel to the axis of the sleeve, through which hole one end of the cord 65 extends and is then knotted to prevent its withdrawal. At the opposite end of tube 105 is a right tube sleeve 115a following the general construction of the sleeve 115 and through a hole 119a in a flange 117a an end of the cord 65a extends and is knotted. It will thus be seen that the front door 24 is counterbalanced by the tension of the sash roller 100 operating through the cords 65 and 65a and that said door will remain in any position to which it may be moved until intentionally displaced from such position.

The sleeves 115 and 115a are independently adjustable circumferentially of the roller 100 to insure that the lengths of the cords 65 and 65a from the door to the roller are exactly the same and thereby eliminate tilting or cocking of the door laterally and thus reduce the friction on the guide rails 72.

Shock mounts

Balances have always been susceptible to vibration. To reduce such susceptibility to vibration in prior balances, special glass and sponge rubber devices were relied upon to support the balance. However, these devices did not sufficiently dampen the vibration, hence, delicate balances have always presented a distinct problem.

According to the present invention balance vibration is practically eliminated or reduced to a minimum by means of the shock mounts 26 and 27. By referring to Figs. 5, 8 and 11 of the drawings the shock mounts each consist of an outer metal sleeve 120, a concentric inner metal sleeve 121 of smaller diameter but longer than the sleeve 120 beyond the ends of which it projects, and an annulus of rubber 122 disposed between and preferably bonded to said sleeves throughout their length, the protruding ends of the rubber annulus being tapered toward the axis of the sleeves. The outer sleeve 120 has an outer diameter to snugly fit within the bore of a hollow boss 28 or 29 and is secured in place therein by a set-screw 123. The shock mounts 26 have their inner sleeves internally screw-threaded, and engaging said threads are leveling screws 124. The shock mount 27 has a foot 125 which is force-fitted into the inner sleeve 121. By virtue of the construction of the shock mounts described, it will be apparent that vertical vibrations will be effectively dampened or eliminated. To effectively dampen lateral vibrations the shock mounts at their inner ends are each provided with a cylindrical headed stud, the shank 126 of which snugly fits within the inner metal sleeve 121 and the head 127 of which snugly fits within the bore of the boss 28 or 29. The hardness of the rubber annulus is so chosen that practically instantaneous damping of all vibration results, thus promoting increased speed in performing the weighing operations.

While we have shown and described a preferred embodiment of our invention, it is to be understood that we do not wish to be limited to the constructional details disclosed, since these may be modified within the range of mechanical and engineering skill without departing from the spirit of our invention as defined in the appended claims.

What we claim is:

1. A weighing balance case comprising a base section, side walls of substantially less width than the corresponding dimension of the base section and having their front edges spaced rearwardly from the front wall of the base section and perpendicular thereto, a top wall connecting said side walls and of less width than the base section and having its front edge spaced rearwardly from the front wall of the base section, and a front door having a front wall portion and side wall portions of greater width at their base than at their top, the front wall portion being inclined to the front edges of the side walls, said front door in closed position extending from the front edges of the side walls and the front edge of the top wall to the front wall of the base section.

2. A balance according to claim 1, wherein the side wall portions of the front door and the side walls have cooperating means for guiding the front door in sliding vertical movement relatively to the base section.

3. A balance case according to claim 1, wherein the top wall and the front door are each provided with transparent panels and the other recited parts are formed of die-cast metal.

4. A balance case according to claim 3, wherein the base section comprises a lower base section and an upper base section, and the side walls are connected to the upper base section.

References Cited in the file of this patent

UNITED STATES PATENTS

| Number | Name | Date |
|---|---|---|
| 364,448 | Steinfield | June 7, 1887 |
| 615,788 | Biele | Dec. 13, 1898 |
| 672,693 | Bank | Apr. 23, 1901 |
| 843,973 | Toussig | Feb. 12, 1907 |
| 934,526 | Hensser | Sept. 21, 1909 |
| 1,901,947 | Bescherer | Mar. 21, 1933 |
| 1,940,461 | Noble | Dec. 19, 1933 |
| 2,141,124 | Bradley | Dec. 20, 1938 |
| 2,432,455 | Smith | Dec. 9, 1947 |
| 2,473,239 | Boyd | June 14, 1949 |
| 2,523,921 | Pratt | Sept. 26, 1950 |
| 2,571,071 | Smith | Oct. 9, 1951 |